INVENTOR.
John C. Miller
BY
ATTORNEYS

United States Patent Office 3,345,235
Patented Oct. 3, 1967

3,345,235
METHOD AND APPARATUS FOR FORMING GELLED PLASTIC PARTICLES FOR USE AS A DECORATIVE SURFACING MATERIAL
John C. Miller, Allentown, Pa., assignor, by mesne assignments, to General Aniline & Film Corporation, a corporation of Delaware
Filed Sept. 5, 1963, Ser. No. 306,953
14 Claims. (Cl. 156—298)

This invention relates to formation of resin particles especially for use in surfacing materials. The invention is particularly concerned with the preparation or formation of particulate polyvinyl resin material in a form especially adapted to be employed for decorative purposes in surfacing products, such as hard surface floor coverings.

The use of polyvinyl resin materials in floor coverings is well known to be advantageous because of the toughness, wear resistance and other characteristics of the vinyl resins which are particularly valuable in floor coverings. The present invention is concerned with a novel technique for preparing vinyl resin materials in a form especially suitable for use in decorating vinyl type surfacing products; and the invention is further concerned with the use of the specially prepared vinyl materials in floor coverings or the like. In this connection, it is an object of the invention to make possible new and distinctive types of decorative effects.

Briefly described, the technique of the present invention (including both the aspect of preparation of the vinyl materials for use in floor coverings or the like and also the aspect of using the specially prepared materials in the floor coverings or the like) includes preliminary formation, in a novel manner, of particles or beads of polyvinyl resin material in a state in which the resin material is gelled but is not completely hardened, incorporation of the gelled beads as decoration in the surfacing product to be made, and finally the heat treatment of the material including the decoration thus applied, in order to fuse and harden the gelled particles.

How the foregoing objects and advantages are attained together with others which will occur to those skilled in the art will appear more fully from the following description referring to the accompanying drawings illustrating preferred equipment for use in carrying out various phases of the technique according to the invention and in which:

FIGURE 1a is an enlarged view of a portion of FIGURE 1 illustrating the action occurring in the formation of the beads;

In considering the various method steps involved and also the equipment, both of which aspects are described below with relation to the figures of the drawings, it is first to be pointed out that the invention is particularly concerned with the use of the polyvinyl chloride type of resin materials or compounds which are known as plastisols including organosols. In general the plastisols comprise relatively high molecular weight polyvinyl chloride resin dispersed in one or more plasticizers which, upon ultimate heating or curing, forms a tough plasticized solid. Organosols are similar dispersed polyvinyl chloride resin materials, but in addition contain one or more volatile liquids which are driven off upon heating.

In addition to the basic resin constituents, other constituents may be present in minor proportions, and notably heat and light stabilizers, viscosity depressants, etc., and for the purposes of the present invention a pigment or dye, in order to contribute color to the particles or beads to be formed. Indeed, it is contemplated that for most purposes beads of a variety of different colors will be employed in combination in order to develop pleasing color pattern effects.

A typical formulation of such a polyvinyl chloride compound which may be employed as a starting material in the technique of the present invention is as follows:

Polyvinyl chloride dispersion resin _____ 100
2,2,4 trimethyl 1,3 pentanediol isobutyrate benzoate _____ 40
Epoxidized soybean oil _____ 6
Barium, cadmium, zinc stabilizer _____ 5
Titanium dioxide _____ 4
High boiling mineral spirits _____ 6

The titanium dioxide in the formulation above will contribute a white color to the product, and this constituent may readily be replaced by other types of pigments, or even various dyes, in order to provide beads of other colors.

The foregoing and other formulations which are suitable for the present invention constitute liquids or liquid dispersions which are capable of undergoing various stages of hardening or fusion, depending upon the conditions of heating the material. The resin dispersions of the kind referred to, in the initial stages of heating, pass through a gel state in which the material is substantially free of tackiness, but does not have its toughness and hardness fully developed. Continued heating of the gelled material, especially at more elevated temperatures results in fusion and development of the full toughness of the material desired in products such as floor coverings or other surfacing materials.

Figure 1:
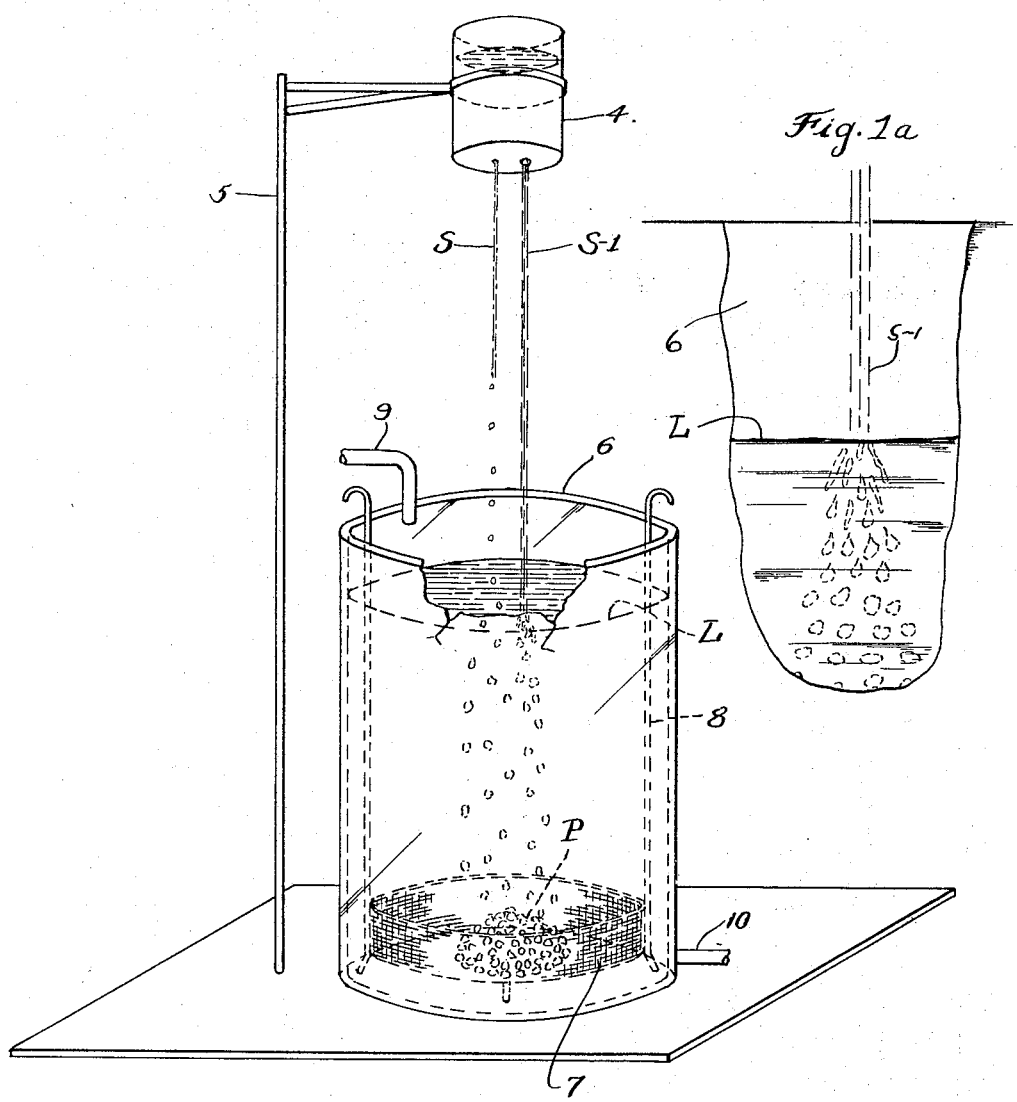
FIGURE 1 is an outline elevational view of a simplified form of equipment for use in preparing the gelled beads according to the invention.

As illustrated in simplified form in FIGURE 1, the present invention contemplates formation of gelled beads from the liquid polyvinyl resin compound by placing such compound in a receptacle 4 mounted by means of a standard 5 in vertically spaced relation above a tank 6 having therein a reservoir or body of water 7, the level of which is indicated at L.

The receptacle 4 is provided with one or more openings in the bottom thereof for the discharge of one or more streams of the resin material such as indicated at S and $S_1$, such streams descending by gravity toward the water in the tank 6. Depending upon various factors mentioned below, the stream of resin material may either break up into droplets before striking the surface of the water or may descend to the water in a substantially continuous stream and then break up into droplets beneath the surface of the water. Thus in FIGURE 1, the stream indicated at S is shown as breaking up prior to reaching the water; whereas the stream indicated at $S_1$ is shown breaking up into droplets only after entering the water bath. This latter stream is also indicated on an enlarged scale in FIGURE 1a.

With the polyvinyl resin materials of the kind above referred to, if the water temperature in the tank 6 is maintained at a value between about 150° F. and the boiling point, and especially between a temperature of 180° F. and the boiling point, the droplets of resin material provided either by a stream such as indicated at S or a stream such as indicated at $S_1$ will solidify or gel as the droplets descend in the water and prior to contact with the bottom of the vessel or with other particles, an accumulation of such particles being indicated at P in the strainer basket 7 which is shown in the bottom of the tank 6 and which may be removed therefrom by means of the rods 8. In this way batches of formed particles or beads may be separated from the water in the tank at intervals, another strainer being immediately replaced in the tank in order to accumulate the succeeding beads being formed.

Replacement of hot water in the tank 6 and thus maintenance of the desired temperature may be effected by supply pipe 9 and the discharge 10.

The employment of the water bath is desirable for a number of reasons including the fact that water has a somewhat lower specific gravity than the resin material so that the beads descend by gravity in the body of water. Water also effects rapid heat transfer to cause gellation of the compound. In addition the water and the resin are immiscible and at the temperature contemplated for use, for instance close to the boiling point, the water is highly volatile and, upon withdrawal of a batch of the formed particles from the tank, all the water or moisture carried by the formed particles quite quickly evaporates, particularly if the material is spread into a relatively thin layer as in a tray. Although it may not always be necessary, it is frequently desirable to have present in the water bath a small amount of wetting agent or surfactant, in order to reduce the tendency toward or avoid floatation of particles or beads on the surface of the bath. Moreover, depending upon the wetting agent used, it may be advantageous to add a small amount of an anti-foaming agent, such a a higher alcohol.

The use of water for the bath is the preferred practice of the invention, but it is to be noted that certain other liquids are usable, such as aqueous salt solution, certain glycols notably diethylene glycol or glycerine. If certain other liquids are employed it may be desirable to wash the beads before ultimate drying or use.

Figure 2:
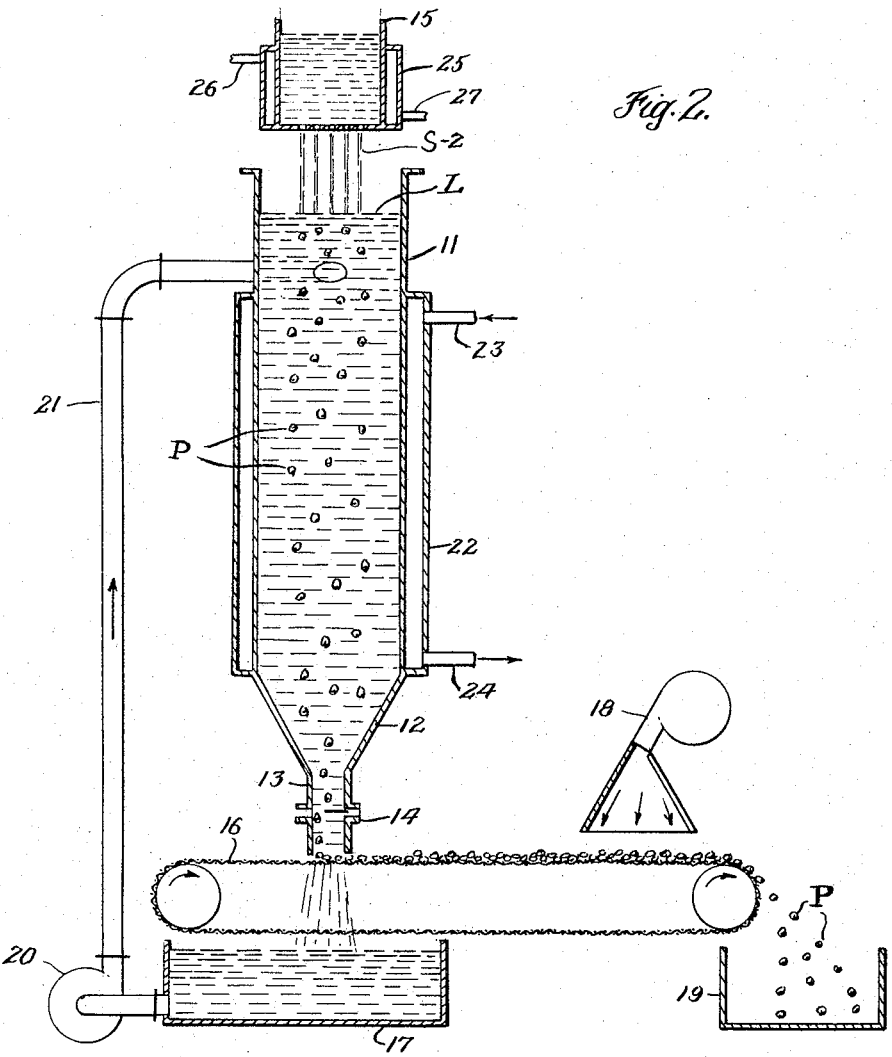
FIGURE 2 is a somewhat diagrammatic elevational view of another form of equipment for preparing the gelled beads.

Before considering the further use of the preliminarily gelled particles, attention is directed to FIGURE 2 illustrating an alternative arrangement of equipment for effecting the gelling of the particles. In FIGURE 2 a tank 11 is provided to establish the water bath, the level of which is again indicated at L. In this instance, the tank has a conical bottom 12 having a discharge connection 13 at the apex provided with a valve 14, for delivering some of the water and formed particles downwardly and out of the vessel 11. Above the top is receptacle 15 for the liquid resin compound or material, this receptacle having a multiplicity of fine holes or apertures in the bottom surface providing for the development of a plurality of streams of resin material descending to the water in the tank 11 such as indicated at $S_2$.

Below the discharge connection 13 is a conveyor carrying a screen or filter cloth 16 through which water may freely pass to the collecting tank or trough 17 arranged below the conveyor. In this instance the formed particles P are carried by the screen through a current of warm air supplied by the blower device diagrammatically indicated at 18, the particles being ultimately discharged from the conveyor into a collecting bin 19.

The water accumulating in the trough 17 is desirably recirculated by means of a pump 20 and returned to the top of the tank 11 as by means of the conduit 21.

The desired water temperature may be maintained by means of a heating jacket 22 adapted for the circulation of a heating medium, for instance steam circulated through inlet and outlet connections 23 and 24. Because of the development of considerable heat in the tank and the rising of heated air and vapor from within the tank and also from the outer surfaces thereof, the resin receptacle 15 is advantageously provided with a cooling jacket indicated at 25 through which a cooling medium such as water at ordinary supply temperatures may be circulated by means of pipes 26 and 27. In this way premature heating of the resin in the receptacle 15 is avoided. Preferably the resin material is kept at a temperature below about 120° F.

In connection with the apparatus, for instance the equipment shown in FIGURE 2, it should be kept in mind that as there illustrated the particles or beads being formed are not necessarily accurately proportioned in relation to the size of the equipment. As brought out below, typical beads may be of the order of 1/16 inch in diameter, whereas a typical tank such as the tank 11 shown in FIGURE 2 may be 6, 8 or even more feet in height and something of the order of 1 to 3 or 4 feet in diameter.

In typical operations with the equipment of either FIGURE 1 or FIGURE 2, the particulate material produced constitutes a free flowing mass of particles in the form of generally spherical beads and substantially free of dust. The material is therefore easy to handle and may readily be applied to or incorporated in the decorative surfacing materials to be made therefrom, for instance in the manner to be described herebelow. With a given set of operating conditions the beads or particles formed will vary somewhat in size, but in typical cases most of the beads or particles will range in size from a diameter of about 1/64 inch to a diameter of about 1/8 inch.

As hereinabove mentioned, various factors will influence the size and also the continuity or discontinuity of the stream of resin material descending by gravity toward the surface of the water bath. Various of these factors will also influence the size and shape of the particles produced. Among the factors which influence the particle size and shape, is first, the rheology of the polyvinyl chloride resin dispersion used, for instance the viscosity of the dispersion, a thinner or lower viscosity dispersion having a tendency to break up into smaller droplets than a dispersion of higher viscosity. Also the formulation of the dispersion employed, particularly with respect to the content of resin and plasticizer and also with respect to the kind of plasticizer, will influence the size and shape of the particles produced. The size of the orifice also has an influence in this connection, and, in general, with the same dispersion, the stream discharged from a smaller orifice tends to break up before reaching the surface of the water bath more than is the case with a stream discharged from a large orifice. The height of free fall of the resin will also influence the action, and with regard to this point it may be noted that in most instances, unless the free fall is exceptionally long, the stream will maintain continuity until it strikes the surface of the water bath. This latter type of condition is illustrated by the stream $S_1$ in FIGURES 1 and 1a. From the enlarged illustration of FIGURE 1a it will be noted that in a typical case where the stream descends to the surface of the water before breaking up, the break-up occurs as the stream enters the water or shortly below the surface and, in a typical situation the break-up initially produces somewhat elongated masses of the resin compound, in some cases even approaching the shape of filaments. As these particles descend in the water they tend to assume, first a somewhat pear-shaped configuration and then a more round or spherical shape, as is suggested in the illustration of FIGURE 1a.

At this point it should also be noted that the shape of the particles produced is influenced by various of the factors mentioned above and also by the temperature of the resin compound as it is introduced into the water bath, as well as the temperature of the water bath. For example if the temperature of the water bath is quite high, the gellation of the particles will be accelerated and will tend to occur before the particles have had an opportunity to change to spherical shape. In this way particles of tear-drop shape and even of filamentary shape may be produced.

Figure 3:
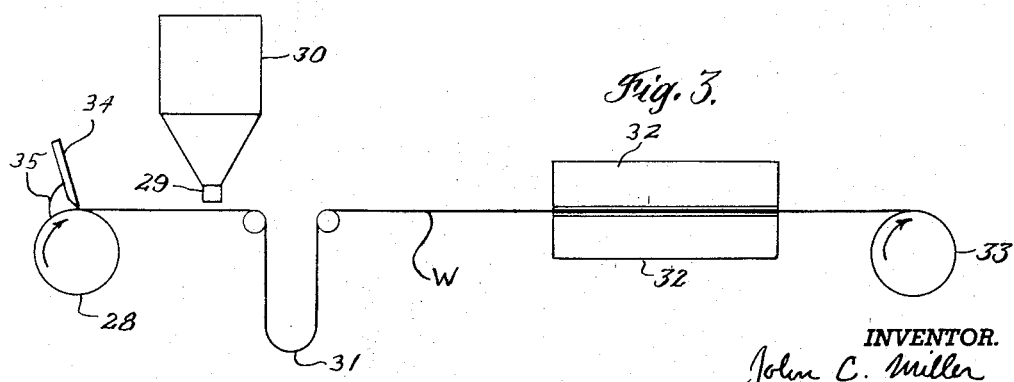
FIGURE 3 is a diagrammatic view illustrating a typical use of the prepared beads according to the practice of the present invention.

Being gelled but incompletely fused, the particles of the resin material prepared in the manner described above are further of advantage in the decoration of surfacing materials because they may readily be deformed as by applying heat and pressure, and in this way may readily be further processed during the manufacture of surfacing materials therefrom according to various techniques such as that described herebelow with particular reference to FIGURE 3.

In considering an illustrative use of the gelled beads, attention is directed to FIGURE 3 in which a web or sheet W is indicated as being continuously supplied from a roll 28, the web passing beneath the discharge spout 29 of a supply bin 30 for gelled beads. After passing through an accumulating loop 31, the web passes through a press comprising a pair of heated press members 32—32, at least one of which is reciprocable, so as to sequentially heat and press successive areas of the web. Ultimately the web is wound up as at 33, the action of this winding operation being intermittent, in view of the step-by-step operation of the press 32—32.

Preferably a coating of polyvinyl chloride resin material, for instance of the kind referred to above as being employed for the preparation of beads, is applied to the web prior to delivery of the beads to the surface of the web. For this purpose a blade 34 may be employed to spread such a resin coating on the web from the resin mass indicated at 35.

In one technique which may be carried out in accordance with the schematic illustration of FIGURE 3, it may be assumed that the web is an asbestos felt on which decorative materials are to be applied in order to form a floor covering. A resin coating may be applied by the blade 34 for instance a coating of white color. Beads of one or more contrasting colors may be distributed on the surface of the web as by means of feed mechanism 29-30, and in this illustrative operation it is assumed that the quantity of gelled beads applied is only sufficient to provide a scattered color effect over the white background coating. The heat and pressure applied by the press 32—32 will result in flattening of the beads and pressing them into the white background coating layer. With press members heated, for instance to a temperature between about 300° F. and 375° F., the heat applied will fuse not only the resin of the white background coating but also the resin of the gelled beads, thereby producing a product having a substantially homogeneous decorative coating.

If desired a sufficient quantity of gelled beads may be applied to a web to be decorated so that upon application of heat and pressure the beads will flow together and form a substantially continuous film or coating on the product.

A number of other variations may also be adopted for instance the web W may comprise a paper strip or sheet which is ultimately to be laminated to a felt base.

In any of the foregoing or other operations in which the gelled particles are used for decorative purposes in a surfacing material such as floor covering, it is contemplated that the incompletely fused resin material of the particles shall be subjected to the required heat to complete the fusion only after the particles have been applied to or incorporated in the product. This has a number of advantages. First, the gelled beads are much more readily handled than is the fully fused material and is also more readily deformed as by pressure rolls. Second, it is possible to produce various new and distinctive decorative effects with the gelled beads. Still further by preliminarily forming gelled particles, then applying the particles as decoration and finally subjecting the material to the temperature required for fusion, the resin material experiences a very favorable heat history, since the sequence of operations does not require attainment of full fusion temperature at any point in the operation prior to the final heating or curing. The technique of the invention thus avoids deterioration of the resin which tends to occur as a result of repeated heating to fusion temperature.

I claim:

1. A method for forming a particulate material from heat hardenable liquid polyvinyl chloride plastisol, which method comprises delivering a thin stream of the liquid resin material at a temperature below about 120° F. from a source of supply downwardly into a water bath through the top surface thereof while the water is at a temperature of from about 150° F. to the boiling point thereof.

2. A method for forming a particulate material from heat hardenable liquid polyvinyl chloride plastisol which method comprises delivering a thin stream of the liquid resin material at a temperature below about 120° F. from a source of supply downwardly into a water bath through the top surface thereof while the water is at a temperature of from about 150° F. to the boiling point thereof, discharging water and formed particles from the water bath, screening the particles from the discharged water, and returning the discharged water into said water bath.

3. A method for forming a particulate material from heat hardenable liquid polyvinyl chloride plastisol, which method comprises establishing a supply of the liquid resin material at a temperature below about 120° F., establishing a water bath at a temperature of from about 150° F. to the boiling point, the water bath being spaced below the resin supply, discharging a stream of the dispersion from said supply, and delivering the discharged material by gravity downwardly into the water bath through the top surface thereof.

4. A method according to claim 3 in which the size of the stream of the resin material discharged from the supply and the vertical distance of gravity delivery of the resin material to the top surface of the water bath are such as to cause the stream to break up into globules before entering the water bath.

5. A method according to claim 3 in which the size of the stream of the resin material discharged from the supply and the vertical distance of gravity delivery of the resin material to the top surface of the water bath are such as to cause the stream to impinge upon the surface of the bath in the form of a substantially unbroken stream and thereby provide for breaking up of the stream into globules in the water bath.

6. Equipment for forming a particulate material from heat hardenable liquid polyvinyl chloride dispersion comprising an open topped receptacle for a water bath with an upwardly exposed surface, means for establishing a temperature of the water in said bath between about 150° F. and the boiling point thereof, and supply means for the resin dispersion including an orifice positioned in spaced relation above the exposed surface of the water bath to provide for downward delivery of the resin dispersion to the water bath.

7. Equipment according to claim 6 and further including a strainer basket removably positioned in the water bath and providing for separation of the particulate material formed from the water bath.

8. Equipment according to claim 6 in which said receptacle has a discharge opening toward the bottom thereof, and further including a movable strainer for receiving the particulate material and effecting separation thereof from water discharged through said discharge opening.

9. A construction according to claim 8 and further including means for returning water discharged through said discharge opening back into the receptacle, an outlet at the bottom of the receptacle for discharging water and resin particles formed, an open topped vessel below said outlet with means for returning water into the receptacle, and a travelling screen between said outlet and said vessel for separating the formed particles from the discharged water.

10. Equipment for forming a particulate material from heat hardenable liquid polyvinyl chloride dispersion, comprising an open topped receptacle for a water bath with an upwardly exposed surface, means for establishing a temperature of the water in said bath between about 150° F. and the boiling point thereof, supply means for the resin dispersion including an orifice positioned in spaced relation above the exposed surface of the water bath to provide for downward delivery of the resin dispersion to the water bath, an outlet at the bottom of the receptacle for discharging water and resin particles formed, an open topped vessel below said outlet with means for returning water into the receptacle, and a travelling screen between said outlet and said vessel for separating the formed particles from the discharged water.

11. A method for making a vinyl type decorative surfacing material comprising heating globules of liquid heat hardenable polyvinyl chloride plastisol to a temperature between about 150° F. and 212° F. to thereby form gelled but incompletely hardened particles, incorporating said gelled particles as decoration in a surfacing sheet, and after incorporation of the particles heating the sheet with the incorporated particles to a temperature between about 300° F. and 375° F. to thereby fuse and harden the gelled particles.

12. A method for making a vinyl type decorative surfacing material comprising heating globules of liquid heat hardenable polyvinyl chloride plastisol to a temperature between about 150° F. and 212° F. to thereby form gelled but incompletely hardened particles, applying said gelled particles to a surfacing sheet, applying pressure to deform the applied particles and thereby develop a decorative effect, and heating the sheet and the particles to a temperature between about 300° F. and 375° F. to thereby fuse and harden the gelled particles.

13. A method for making a vinyl type decorative surfacing material comprising heating globules of liquid heat hardenable polyvinyl chloride plastisol to a temperature between about 150° F. and 212° F. to thereby form gelled but incompletely hardened particles, applying said gelled particles as decoration to a surfacing sheet incorporating vinyl resin material, and after application of the particles heating the sheet with the applied particles to a temperature between about 300° F. and 375° F. to thereby fuse and harden the gelled particles and bond the fused particles to the resin of said sheet.

14. A method for making a vinyl type decorative surfacing material comprising heating globules of liquid heat hardenable polyvinyl chloride plastisol to a temperature between about 150° F. and 212° F. to thereby formed gelled but incompletely hardened particles, incorporating said gelled particles in a surfacing sheet, applying pressure to said sheet to deform the incorporated particles and thereby develop a decorative effect, and heating the sheet with the incorporated particles to a temperature between about 300° F. and 375° F. to thereby fuse and harden the gelled particles.

References Cited
UNITED STATES PATENTS

| | | | |
|---|---|---|---|
| 2,202,481 | 5/1940 | Cox et al. | 264—13 X |
| 2,528,469 | 10/1950 | Condo et al. | 260—92.8 |
| 2,543,928 | 3/1951 | O'Neill et al. | 264—13 |
| 2,556,260 | 6/1951 | Downing | 260—92.8 |
| 2,888,975 | 6/1959 | Benedict | 156—303 X |
| 3,051,682 | 8/1962 | Ott | 260—93.5 X |
| 3,148,076 | 9/1964 | Snyder | 117—21 |
| 3,161,623 | 12/1964 | Kuhne | 260—92.8 |

EARL M. BERGERT, *Primary Examiner.*

HAROLD ANSHER, *Examiner.*